United States Patent
Göbel et al.

(10) Patent No.: US 7,223,934 B2
(45) Date of Patent: May 29, 2007

(54) HAND WELDING DEVICE, WELDING APPARATUS AND WELDING GAUGE

(75) Inventors: Bernhard Göbel, Lahnau (DE); Hans-Gerhard Kortmann, Vechelde (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/812,397

(22) Filed: Mar. 29, 2004

(65) Prior Publication Data

US 2004/0245222 A1 Dec. 9, 2004

Related U.S. Application Data

(63) Continuation of application No. PCT/EP02/10874, filed on Sep. 27, 2002.

(30) Foreign Application Priority Data

Oct. 1, 2001 (DE) .................. 101 49 762

(51) Int. Cl.
*B23K 9/20* (2006.01)
(52) U.S. Cl. .......................... 219/98; 219/99
(58) Field of Classification Search ............ 219/98, 219/99
See application file for complete search history.

(56) References Cited

U.S. PATENT DOCUMENTS

| | | | |
|---|---|---|---|
| 2,260,969 A | | 10/1941 | Crecca et al. |
| 2,329,932 A | | 9/1943 | Nelson |
| 2,945,118 A | * | 7/1960 | Kelemen et al. ............ 219/98 |
| 3,832,515 A | * | 8/1974 | Tauem ........................ 219/98 |
| 3,940,587 A | * | 2/1976 | Oehry ........................ 219/98 |
| 3,940,588 A | | 2/1976 | Oehry et al. |
| 4,567,344 A | | 1/1986 | Michalski, Jr. |
| 4,594,495 A | * | 6/1986 | Glorioso .................... 219/98 |

(Continued)

FOREIGN PATENT DOCUMENTS

DE 43 24 223 1/1995

(Continued)

OTHER PUBLICATIONS

International Search Report for PCT/EP02/10874, dated Feb. 13, 2003, 4 pages.

(Continued)

*Primary Examiner*—Len Tran
(74) *Attorney, Agent, or Firm*—Harness, Dickey & Pierce, P.L.C.

(57) ABSTRACT

A hand welding device for short-time arc welding of elements, such as metal studs, onto parts, such as metal sheets, having a handlable housing, a holding means mounted on the housing to hold an element to be welded onto a part, a reciprocating means mounted on the housing to advance and restore the holding means relative to the housing, and positioning means mounted on the housing to maintain a predetermined distance from the part, is proposed. Further, a corresponding welding apparatus having such a hand welding device and a welding gauge fastened to the part, is proposed.

Here the positioning means are offset to the rear relative to the anterior end of the holding means, so that the positioning means are suitable for being supported on the welding gauge to maintain the predetermined distance. For this purpose, a vertically adjustable stop is provided on a welding gauge according to the invention.

47 Claims, 1 Drawing Sheet

U.S. PATENT DOCUMENTS

| | | |
|---|---|---|
| 5,030,815 A | 7/1991 | Glorioso |
| 5,252,802 A | 10/1993 | Raycher |
| 5,384,445 A | 1/1995 | Nakagami |
| 5,452,839 A | 9/1995 | Kapusnik et al. |
| 6,011,234 A | 1/2000 | Kirchner et al. |
| 6,660,958 B2 | 12/2003 | Kurz et al. |
| 2005/0056620 A1 | 3/2005 | Broehl |

FOREIGN PATENT DOCUMENTS

| | | |
|---|---|---|
| DE | 200 03 127 | 6/2000 |
| EP | 1123769 | 8/2001 |
| GB | 2092044 | 8/1982 |
| JP | 200301343 | 10/2000 |
| WO | WO 96/05015 | 2/1996 |
| WO | WO 96/11767 | 4/1996 |
| WO | WO 03/013776 | 2/2003 |
| WO | WO 03/020466 | 3/2003 |
| WO | WO 03/070412 | 8/2003 |

OTHER PUBLICATIONS

Stud Welding Logic. A New Tucker Technology!, dated Sep. 1999.

* cited by examiner

HAND WELDING DEVICE, WELDING APPARATUS AND WELDING GAUGE

CROSS-REFERENCE TO RELATED APPLICATIONS

This application is a continuation of PCT International Application No. PCT/EP02/10874, filed on Sep. 27, 2002, which claims priority to German application no. DE 10149762.8, filed on Oct. 1, 2001, both of which are incorporated herein by reference.

BACKGROUND AND SUMMARY OF THE INVENTION

The present invention relates to a hand welding device for short-time arc welding of elements, such as metal studs, to parts, such as metal sheets, having a handlable housing, a holding means mounted on the housing to hold an element to be welded onto a part, a reciprocating means mounted on the housing for setting and resetting the holding means relative to the housing, and positioning means mounted on the housing to maintain a predetermined distance from the part.

The present invention relates further to a welding apparatus having a part, such as a metal sheet, a hand welding device holding an element, such as a metal stud, to be welded onto the part, and a welding gauge fastened to the part, said hand welding device comprising positioning means for maintaining a predetermined distance from the part. Finally, the present invention relates to a welding gauge for positioning a hand welding device on a part, such as a metal sheet. Such hand welding devices for short-time arc welding are universally known.

In short-time arc welding (also known as stud welding) elements such as metal studs are welded onto metal parts such as metal sheets. The studs serve as anchors for various fastening purposes. Accordingly, the studs may be configured as threaded studs (with metric thread), as coarse-threaded studs, pine tree studs, T-studs, etc. In the automotive industry, stud welding has been much used for some years. Here the stud welding technology serves to fasten body parts, to lay electric leads, to fasten carpeting, etc. Predominantly, in the automotive industry, robots are employed to achieve high productivity where a stud welding unit is fastened to the end of a robot arm. The stud welding unit is connected to an electrical energy supply and to an automatic stud feeding device.

In the automotive industry, the so-called stroke ignition process is especially used. Here a metal stud is first placed in the location on the metal sheet where it is to be welded on. Then a so-called pilot current is switched on and the metal stud is lifted somewhat relative to the metal sheet. Thus an electric arc is set. Then the welding current proper is switched on and the mutually opposed faces are incipiently fused by the high-energy electric arc. Then the metal stud is again lowered onto the metal sheet so that the respective melts will mingle. The arc is short-circuited. The combined melt solidifies and the welding operation is complete.

In the case of robot-supported stud welding units, the approach to the welding position and the moving of the metal stud are automated by means of a reciprocating device. Especially the reciprocating motions of the metal stud relative to the metal sheet are very small (millimeter range). To obtain consistently good welding results, it is important that the stud welding unit be always exactly positioned relative to the metal sheet and that the stroke of the reciprocating device is always exactly maintained.

Besides the robot-supported stud welding units, there are also hand welding devices for stud welding. The known hand welding devices also comprise a holding device for holding one metal stud at a time and a reciprocating device for advancing and resetting the holding device, and with it the metal stud relative to a housing of the hand welding device. To achieve consistently good welding results, it is indispensable that positioning means be provided, serving to keep the distance to the part constant.

As a rule, hand welding devices comprise one or more supporting feet for this purpose, extending parallel to the holding means. Alternatively, there are also so-called nozzles, of tubular configuration and surrounding the holding means. Before a welding operation is initiated, the supporting feet, or the nozzle, are set on the part or metal sheet. Then the reciprocating device is first actuated to place the metal studs on the sheet metal. Then the pilot current is switched on, the arc is set, and the welding operation proper is completed. Alternatively, the reciprocating means is pre-stressed so that the holding device stands slightly ahead on the metal sheet before the stud is placed. In the welding position, the stud and the anterior end of the supporting foot or nozzle lie in contact with the metal sheet. The supporting foot or the nozzle thus always maintains an exact relative position between the hand welding device or its housing and the metal sheet.

The supporting foot and/or the nozzle extend parallel to the centerline, essentially as far as the anterior end of the holding means. This is essentially unproblematical in the case of plane metal sheets. However, there are applications in which metal studs are to be welded onto curved surfaces. With close radii of curvature in the area of the weld, it may happen that the supporting foot and/or the nozzle come into contact in the area of curvature. Consequently there is the wrong distance between the metal stud and the metal sheet before the welding operation proper is begun. This may lead to problems in terms of quality of the welding operation.

Here a single supporting foot is still advantageous inasmuch as suitable rotation can be found between hand welding device and metal sheet, possibly a position in which the supporting foot rests in contact with a plane area. With several supporting feet and/or the nozzle, this possibility is not available. With a single supporting foot, however, there is great danger that the hand welding device may be held oblique relative to the metal sheet, and this too may impair the quality of the weld.

Motor vehicle models are often fabricated in different places. In some places, there are robots prepared for stud welding. In other places, welding must be done by hand. The bodywork parts, however, are in all cases the same. Therefore the bodywork designer must so choose the location of studs to be welded on that welding by hand is possible. Here the designer is at present limited to places where no unduly sharp curvatures are present. In the case of fabrication in places with no robot support, and for small series or in repair work, it is known that a welding gauge may be fastened to the part or metal sheet. The welding gauge serves to weld the metal stud exactly in the desired place. For this purpose the hand welding device may be guided to the welding gauge parallel to the centerline in order thereby to fix the location of the weld.

The welding gauge is as a rule fixed to the metal sheet at a distance therefrom, and comprises an opening. In the case of the hand welding device with nozzle, the opening is of circular configuration. The diameter of the opening is adapted to the outside diameter of the nozzle, so that the hand welding device is guided by means of the nozzle.

Against the background of the above mentioned prior art, the object of the present invention is to specify an improved hand welding device, an improved welding apparatus and an improved welding gauge. In the hand welding device initially mentioned, this object is accomplished in that the positioning means are offset to the rear relative to the anterior end of the holding means, so that the positioning means are able to bear on a welding gauge fixed to the part in order to maintain the predetermined distance. Finally, the above object is accomplished by a welding gauge for positioning a hand welding device on a part, such as a metal sheet, having an opening through which a holding means of the hand welding device can be passed to the part in order to weld an element, such as a metal stud, to the part, and at least one stop adjustable upward against which the positioning means of the hand welding device can be set, in order to maintain a predetermined distance of the hand welding device from the part.

By maintaining the correct distance between the hand welding device and the part, or metal sheet, in that the housing of the hand welding device, or positioning means provided thereon, act directly on the welding gauge and do not contact the part itself at all, welding operations can be performed also in the area of curved locations. The positioning means, in all operating conditions and particularly in the welding position, are offset to the rear relative to the anterior end of the holding means.

The welding gauge is rigidly mounted on the part and itself has sufficient rigidity to ensure an exact positioning. Consequently, a supporting foot extending parallel as far as the anterior end of the holding means, or a corresponding nozzle, may be dispensed with. Consequently, welding operations may be performed even where the surface of the part is extremely curved in the immediate neighborhood. Consequently the bodywork designer has greater degrees of freedom in the arrangement of places where the studs are to be welded on. In this way, expense can be saved even at the design level.

For the welding gauge according to the invention, it is of advantage that the stop against which the positioning means of the hand welding device can be set be adjustable in height. The welding gauge according to the invention in fact does not serve only for correct guidance of the hand welding device on its way to the correct weld location. It also serves to fix the distance of the hand welding device from the part. Owing to the adjustability of the stop, there is the possibility here of adjusting the welding gauge exactly and/or adapting it to different applications.

In the hand welding device according to the invention, it is advantageous if the positioning means comprise at least one pin extending essentially parallel to the direction of action of the holding means. In this way, an exact positioning can be realized, particularly in an axial direction, with little engineering outlay on the hand welding device.

It is especially preferred if the positioning means comprise two positioning elements, in particular two pins. With two pins, the position of the hand welding device can be exactly oriented laterally as well, and to a large extent, the manual welding device can be prevented from approaching the part obliquely. One or two pins will not indeed serve to achieve perfect tilting stability as this requires three pins. It has been found, however, that even with only one pin, better with two pins, it is possible for the user to position the hand welding device essentially perpendicular in relation to the part if the welding gauge provides sufficient axial guidance. Here it is of especial advantage if the two pins and the centerline lie at the vertices of an equilateral triangle, to which the axis is perpendicular. This symmetry results in a high stability over all.

According to a further proposal of the invention, provision may be made that the positioning means comprise three positioning elements, in particular pins, the end points of the positioning elements lying at the vertices of a triangle. By this conformation, stable support of the hand welding device on the welding gauge is assured, and so is an exact orientation of the centerline with the part. The element to be welded onto the part may therefore be welded to the part with great precision as to position and angle. Another advantage of this conformation is that an axial guidance on the welding gauge may be dispensed with, so that the mounting of the hand welding device on the welding gauge and its removal therefrom is facilitated, thus simplifying handling.

In the welding apparatus according to the invention, it is of advantage if the welding gauge comprises support means for the positioning means, which support means may be designed to guide the positioning means axially, in order thus to fix the weld location. The support means serve firstly to maintain the predetermined distance and secondly to perform the actual function of the welding gauge, namely to fix the weld location in the plane of the part. Advantageously, the support means of the welding gauge comprise at least two depressions, one positioning element acting in each depression, to be oriented therein. With two depressions, the position of the hand welding device on the welding gauge can be uniquely determined. If a third positioning element is present, it requires support in axial direction only.

If the hand welding device comprises three pins for support on the welding gauge, then according to a further proposal of the invention, the application and removal of the hand welding device may be facilitated in that the depressions comprise an opening narrowing down towards the bottom. Consequently the welding gauge can be realized economically. Here it is of special advantage if the welding gauge comprises an opening for the holding means, the cross-section of the opening being essentially greater than the cross-section of the holding means. Contrary to conventional welding gauges, therefore, the opening for the holding device no longer has any guidance function. In this way it is more readily possible to inspect the part visually prior to the welding operation.

According to another preferred embodiment, the welding gauge comprises support means for the positioning means, said support means comprising means for adjusting the distance. The support means as a rule comprise one or more stops, adjustable in height. In this way it is possible to optimize the welding gauge for the current weld location and operation and to make readjustments. The features mentioned above, and the features yet to be illustrated, may be employed not only in the particular combination specified, but also in other combinations or alone.

BRIEF DESCRIPTION OF THE DRAWINGS

Embodiments of the invention are represented in the drawing by way of example and will be illustrated in more detail in the following description. In the drawing.

DETAILED DESCRIPTION OF THE INVENTION

Figure 1:
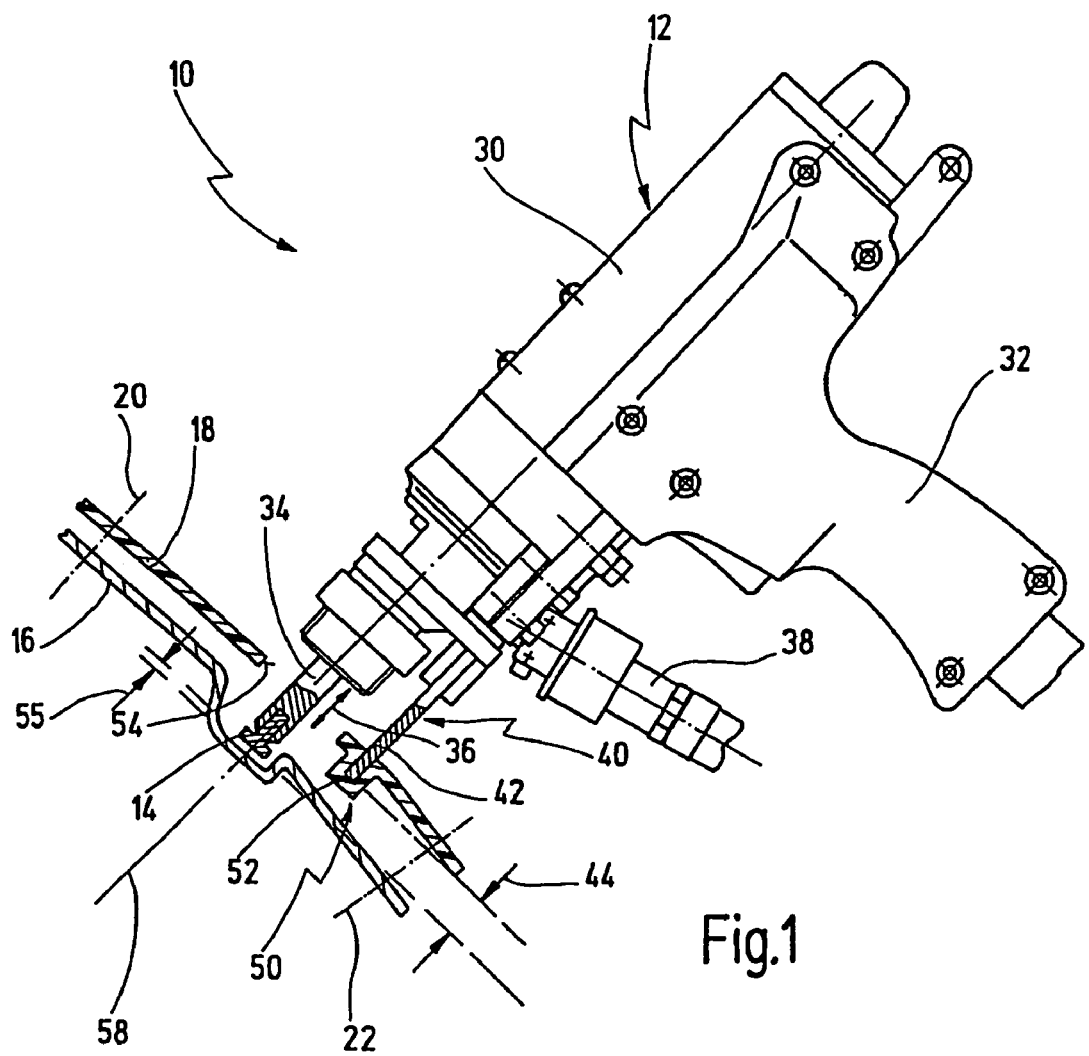
FIG. 1 shows a schematic, partly sectional side view of a welding apparatus according to the invention.

In FIG. 1, an embodiment of a welding apparatus according to the invention is generally designated 10. The welding apparatus includes a hand welding gun 12 serving to weld an element in the form of a metal stud 14 onto a part in the form of a metal sheet 16. A welding gauge 18 of plastic is fixed to the metal sheet 16 at schematically indicated fastening points 20 and 22. The welding gauge 18 may also be made of metal.

The hand welding gun 12 comprises a housing 30 and a grip 32. A holding means 34 is mounted on the housing 30 to hold one metal stud 14 at a time. The holding means 34 is mounted, more precisely speaking, on a reciprocating means arranged in the housing 30 and schematically indicated at 36. The reciprocating means 36 serves to advance and return the holding means 34 relative to the housing 30. In one embodiment, the reciprocating means 36 comprises a spring pre-stressing the holding means 34 in one direction, in particular in an approach direction, that is, towards the part 16. For motion in reverse direction, an electromagnet may be provided. Alternatively, the reciprocating means 36 comprises, for example, a linear electric motor.

Further, the hand welding gun 12 comprises a feed means 38 by way of which the metal studs 14 can be fed automatically, for example by pneumatic means. The holding means 34 is of tubular configuration for this purpose, so that the feed means 38 can feed the metal studs 14 at a posterior end of the tube and then carry them by compressed air as far as an anterior end of the holding means 34. In the representation of FIG. 1, the holding means 34 is shown as a largely solid element for greater simplicity.

The holding means 34 extends along a centerline 58. Parallel to this, positioning means 40 are provided on the housing 30, serving to position the hand welding device 12 at a predetermined distance 44 from the part 16. In the embodiment shown, the positioning means 40 comprise two pins 42 side by side and oriented parallel to each other, extending from the housing 30 parallel to the centerline 58. In FIG. 1, however, only one pin 42 is shown. Here the pins 42 are definitely shorter than the holding means 34 in the position of maximum extension, and are also offset to the rear relative to an anterior end of the holding means 34 in the welding position.

The length of pins 42 are designed to rest upon support means 50 on the welding gauge 18. In the embodiment shown, the support means 50 comprise two receivers 52 arranged side by side. In FIG. 1, only one pin 42 is shown and consequently only one receiver 52. The receivers 52 are arranged neighboring to an opening 54 in the welding gauge 18. The opening 54 serves for introduction of the holding means 34 as far as the metal sheet 16. The opening 54 is in each instance definitely greater than the holding means 34. Hence it is possible to inspect the weld location even after the hand welding gun 12 has been set on.

The receivers 52 form stops for the pins 42, and consequently ensure that a predetermined distance 44 from the part 16 is maintained. Further, the receivers 52, as may be seen in FIG. 1, are configured as blind holes, each of which has an inside diameter matching the outside diameter of the pins 42. Consequently the receivers 52 serve also to position the hand welding gun 12 in a direction perpendicular to the centerline 58, namely to fix the weld location.

A welding operation is carried out as follows. First a metal stud 14 is supplied by the feed means 38 and held by the holding means 34 at its anterior end. Then the hand welding gun 12 is so positioned that the two pins 42 are introduced into the receivers 52, namely until they rest against the bottom. Here the pins 42 are preferably so guided in lengthwise direction so far that the hand welding gun 12 spatially assumes a defined position in relation to the welding gauge 18 and consequently in relation to the part 16. In other words, the axial guidance of the receivers 52 prevents any tilt about an axis connecting the two receivers 52. In this operation, the holding means 34 has been introduced through the opening 54. The element 14, owing to an internal spring pre-stress of the reciprocating means 36, rests in contact with the part 16. In FIG. 1, for the sake of clarity, the metal stud 14 is shown distanced from the part 16, as is schematically shown in FIG. 1 at 55.

Next, the welding operation is begun by actuating an unmarked 'trigger lever' on the grip 32. This applies a pilot current; the holding means 34 with metal stud 14 is lifted from the part 16, as schematically shown at 55 in FIG. 1, so that an arc is set. Then a welding current is switched on so that the face of the metal stud 14 towards the part 16 and the corresponding counter surface on the metal sheet 16 are incipiently fused. Then the reciprocating means 36 is released again (an electromagnet is switched off) so that the spring of the reciprocating means 36 presses the metal stud 14 onto the metal sheet 16. Thus the melts combine, the arc is short-circuited and the welding current is switched off. The respective melts solidify. The welding operation is complete. Then the hand welding gun 12 can be removed, retracting the pins 42 from the receivers 52.

Figure 2:
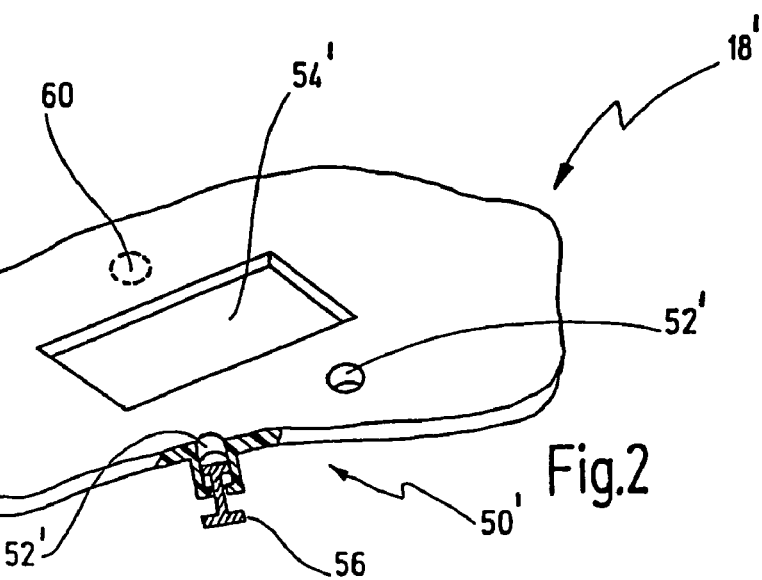
FIG. 2 shows a perspective, partly sectional view of a modified embodiment of a welding gauge according to the invention.

A modified embodiment of a welding gauge 18' according to the invention is shown in FIG. 2. The welding gauge 18', like the welding gauge 18, comprises two receivers 52' for the pins 42 and an opening 54' for the reciprocating means 34. The receivers 52', however, are each provided with an adjusting means 56 to adjust the depth of the receivers 52' and consequently the distance 44. In FIG. 2, the adjusting means 56 for one of the two receivers 52' are shown in the form of a setscrew. A corresponding setscrew is provided on the other receiver 52' as well.

Although in general it is also possible to provide corresponding adjusting means on the positioning means 40, the arrangement of adjusting means on the welding gauge 18' is of advantage, since a fine adjustment is possible for each individual weld location. For in many cases, there is a plurality of metal studs 14 to be welded to a metal sheet 16. Hence a welding gauge 18 often contains a plurality of openings 54 and corresponding receivers 52. Because of the adjusting means on the welding gauge 18', the metal studs 14 can be welded on one after another, without need for adjustments of the welding gun 12 meanwhile. FIG. 2 also shows that besides the opening 54', another receiver 60 may be provided. In particular when the receivers 52 can have only a short actual guidance, or none, a third receiver 60 can be used, in order to achieve a stable positioning of the hand welding gun 12 in all three coordinate axes relative to the metal sheet 16.

The invention claimed is:

1. A welding apparatus for welding an element to a component, the apparatus comprising:
   a) a hand held welding gun including an element holder, an electromagnetic actuator operably advancing the holder, and a pneumatic element feeding hose;

b) a welding gauge fixed to the component, the gauge having a component-facing surface which is three-dimensionally contoured, and the gauge includes at least one receptacle and at least one through-hole; and c) an elongated pin attached to the gun and extending substantially parallel to an advancing direction of the holder;

wherein the pin maintains a known distance between the element and the component, when the pin is in physical contact with the receptacle of the gauge; and the holder operably advancing and assisting in welding the element to the component.

2. The apparatus of claim 1, wherein the element is a metal stud and the component is a metal sheet, and the gauge has an offset section to engage a curved surface of the sheet.

3. The apparatus of claim 1, wherein the element is a metal weld stud and the component is a metal sheet of a motor vehicle, and the weld stud is stroke ignition, drawn arc-welded onto the sheet.

4. The apparatus of claim 1, wherein the elongated pin operably positions the element perpendicular to the component.

5. The apparatus of claim 4, wherein the gauge includes a hole through which the element and the holder extend, the hole being at least twice as wide as the holder.

6. The apparatus of claim 1, wherein depth of the gauge is adjustable.

7. The apparatus of claim 1, further comprising a threaded adjustment member attached to the gauge, the member contacting the component.

8. The apparatus of claim 1, further comprising a second pin directly contacting the gauge.

9. The apparatus of claim 1, wherein the pin contacts against an adjustable threaded stop attached to the gauge.

10. The apparatus of claim 1, further comprising at least three of the pins extending from the welder and contacting the gauge.

11. The apparatus of claim 1, wherein the gauge is a plastic material.

12. The apparatus of claim 10, wherein the pins are placed in a triangle pattern around the element.

13. A welding system for joining a piece to a part, the system comprising:

a) a hand welder operably welding the piece to the part;

b) a holder operably holding the element relative to the part;

c) an elongated and substantially straight positioner offset relative to the holder and being attached to the welder; and d) a welding gauge coupled to the part when the positioner is in contact with the gauge, the gauge including a through-hole operably receiving the holder, the gauge further including a receiver having a bottom operably directly contacting the positioner, the receiver being adjacent the hole.

14. The apparatus of claim 13, wherein the piece is a metal stud and the part is a metal sheet, and the gauge is three dimensionally contoured to engage a curved surface of the sheet.

15. The apparatus of claim 14, wherein the metal stud and the metal sheet are parts of a motor vehicle.

16. The apparatus of claim 13, further comprising an alignment feature in the welding gauge.

17. The apparatus of claim 13, further comprising a threaded member extending between the gauge and the part.

18. The apparatus of claim 17, wherein the threaded member allows the depth of the hole of the gauge to be adjustable relative to the part.

19. The apparatus of claim 13, wherein the positioner is a pin, the holder of the welder projecting beyond an end of the pin facing the part.

20. The apparatus of claim 13, wherein there are at least three of the positioners disengagably coupling the welder to the gauge.

21. The apparatus of claim 13, further comprising a second positioner, wherein the positioners are elongated, rod-like pins disengagably coupling the welder to the gauge.

22. The apparatus of claim 13, wherein the hole in the gauge has a rectangular peripheral shape.

23. The apparatus of claim 13, further comprising a second receiver, with a bottom, mating with a second elongated positioner extending from the welder substantially parallel to the first positioner and the holder.

24. The apparatus of claim 13, further comprising an adjustable stop attached to the gauge.

25. The apparatus of claim 13, wherein the gauge is a plastic material.

26. The apparatus of claim 24, wherein the positioners are placed in a triangle pattern around the holder.

27. A process including a welding gauge to weld an element to a component using a hand held welder, the process comprising:

a) attaching the welding gauge to the component;

b) positioning the hand held welder in the welding gauge having a receiver with a bottom and contacting an elongated pin extending from the welder against the bottom;

c) holding the element in the welder at a known distance from the component;

d) contacting the element against the component through a hole in the gauge;

e) turning on a pilot current;

f) lifting the element away from the component to create an electric arc;

g) turning on a welding current;

h) lowering the element onto the component to mingle the molten material; and i) solidifying the combined molten material to weld the element to the component at a curved surface of the component.

28. The process of claim 27, wherein the element is a metal stud and the component is a metal sheet, further comprising engaging the curved surface of the sheet with a three dimensionally contoured section of the gauge.

29. The process of claim 28, wherein the metal stud and the metal sheet are parts of a motor vehicle.

30. The process of claim 27, further comprising removably inserting an end of the pin into a mostly enclosed receiver of the welding gauge.

31. The process of claim 30, wherein the gauge includes a hole through which the element and an element holder of the welder extends, the hole being at least twice as wide as the holder.

32. The process of claim 31, further comprising adjusting the depth of the gauge.

33. The process of claim 30, wherein an element-holder of the welder extends further toward the component than the substantially parallel pin.

34. The process of claim 30, further comprising engaging at least three pins between the welder and the gauge.

35. The process of claim 27, further comprising aligning a combination of holes and elongated, rod-like pins.

36. The process of claim 27, further comprising adjusting the distance of a portion of the gauge relative to the component in a repeatable manner.

37. The process of claim 27, further comprising adjusting a threaded member attached to the gauge, the member contacting the component.

38. The process of claim 27, further comprising making the gauge from a plastic material.

39. The process of claim 27, further comprising placing multiples of the pin in a triangle pattern around the element.

40. A stud welding apparatus comprising:
a) a stud welder;
b) a gauge including at least one through-hole operably aligned with the welder;
c) at least one elongated positioner extending between and operably positioning the welder relative to the gauge, the gauge being disengaged from the welder after welding; and
d) at least one adjustable member attached to the gauge and extending from a side of the gauge substantially opposite the positioner, an end of the positioner directly contacting against the adjustable member.

41. The apparatus of claim 40, wherein the adjustable member is externally threaded, the welder is a hand-held welding gun, and the gauge is disengageable from the welder without requiring loosening of any fasteners.

42. The apparatus of claim 40, further comprising at least a second elongated positioner directly contacting against both the welder and the gauge.

43. The apparatus of claim 40, wherein the positioner is an elongated pin extending parallel to a stud-holder of the welder and the holder has a distal end extending further than a distal end of the pin.

44. The apparatus of claim 40, wherein the gauge includes a receptacle that operably receives a distal end of the positioner.

45. The apparatus of claim 44, wherein the adjustable member is at least partially located within the receptacle of the gauge.

46. The apparatus of claim 40, wherein the stud welder is an arc welder including an electromagnetic actuator operably moving a stud-holder.

47. The apparatus of claim 40, further comprising a pneumatic stud feeder line coupled to the welder.

* * * * *